United States Patent
Kosar et al.

(10) Patent No.: US 9,707,524 B2
(45) Date of Patent: Jul. 18, 2017

(54) WATER FLUX POLYMER MEMBRANES

(75) Inventors: Walter Kosar, Pottstown, PA (US); Noah E. Macy, Royersford, PA (US); Scott C. Schmidt, Woodbury, MN (US); Jason S. Ness, Norristown, PA (US); Jennifer Biscarat, Cotignac (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/126,670

(22) PCT Filed: Oct. 9, 2009

(86) PCT No.: PCT/US2009/060098
§ 371 (c)(1),
(2), (4) Date: Apr. 28, 2011

(87) PCT Pub. No.: WO2010/051150
PCT Pub. Date: May 6, 2010

(65) Prior Publication Data
US 2011/0207841 A1    Aug. 25, 2011

Related U.S. Application Data

(60) Provisional application No. 61/108,911, filed on Oct. 28, 2008.

(51) Int. Cl.
*B01D 71/34* (2006.01)
*B01D 71/80* (2006.01)
*B01D 67/00* (2006.01)
*B01D 69/02* (2006.01)
*B01D 71/40* (2006.01)

(52) U.S. Cl.
CPC ......... *B01D 71/80* (2013.01); *B01D 67/0006* (2013.01); *B01D 69/02* (2013.01); *B01D 71/34* (2013.01); *B01D 71/40* (2013.01); *B01D 2325/36* (2013.01)

(58) Field of Classification Search
CPC .................................. B01D 71/34; B01D 71/80
See application file for complete search history.

(56) References Cited

U.S. PATENT DOCUMENTS

| | | | |
|---|---|---|---|
| 4,203,848 A | 5/1980 | Grandine, II | |
| 4,387,121 A | 6/1983 | Cautilli et al. | |
| 4,432,875 A * | 2/1984 | Wrasidlo et al. | 210/500.34 |
| 4,618,533 A | 10/1986 | Steuck | |
| 4,776,959 A * | 10/1988 | Kasai et al. | 210/490 |
| 4,855,163 A | 8/1989 | Joffee et al. | |
| 5,066,401 A * | 11/1991 | Muller et al. | 210/500.35 |
| 5,079,272 A | 1/1992 | Allegrezza, Jr. et al. | |
| 5,190,989 A * | 3/1993 | Himori | 522/57 |
| 6,111,025 A | 8/2000 | Visger et al. | |
| 6,437,040 B2 | 8/2002 | Anthony et al. | |
| 6,447,943 B1 * | 9/2002 | Peled et al. | 429/494 |
| 6,506,837 B2 | 1/2003 | Destarac et al. | |
| 7,691,797 B2 | 4/2010 | Schmidt et al. | |
| 7,745,535 B2 | 6/2010 | Schmidt et al. | |
| 7,868,087 B2 | 1/2011 | Maves et al. | |
| 7,989,551 B2 | 8/2011 | Arriola et al. | |
| 2002/0092809 A1 | 7/2002 | Ries et al. | |
| 2002/0155311 A1 | 10/2002 | Maves et al. | |
| 2003/0162896 A1 | 8/2003 | Destarac et al. | |
| 2004/0092661 A1 * | 5/2004 | Hedhli et al. | 525/55 |
| 2004/0224001 A1 * | 11/2004 | Pacetti et al. | 424/423 |
| 2005/0176893 A1 * | 8/2005 | Rana et al. | 525/242 |
| 2005/0221193 A1 | 10/2005 | Kinouchi et al. | |
| 2006/0052545 A1 | 3/2006 | Guerret et al. | |
| 2006/0258761 A1 * | 11/2006 | Boock et al. | 521/50 |
| 2007/0021569 A1 * | 1/2007 | Willis et al. | 525/314 |
| 2008/0033115 A1 | 2/2008 | Koroskenyi et al. | |
| 2008/0058475 A1 | 3/2008 | Schmidt | |
| 2009/0155182 A1 * | 6/2009 | Mauro et al. | 424/9.6 |
| 2009/0221739 A1 | 9/2009 | Knischka et al. | |
| 2011/0017661 A1 * | 1/2011 | Kosar | 210/500.27 |

FOREIGN PATENT DOCUMENTS

| | | | |
|---|---|---|---|
| CN | 101139089 A | | 3/2008 |
| CN | 101190401 A | * | 6/2008 |
| JP | 61257203 | | 11/1986 |
| JP | H022862 | | 1/1990 |
| JP | 2006205067 A | | 8/2006 |
| WO | WO 2007140225 A2 | * | 12/2007 |

OTHER PUBLICATIONS

Hester, J. F., et al., "Design and performance of foul-resistant poly(vinylidene fluoride) membranes prepared in a single-step by surface segregation", Journal of Membrane Science 202, (2002), pp. 119-135.
Won Ho Choi, Won Ho Jo; "Preparation of new proton exchange membrane based on self-assembly of Poly(styrene-co-styrene sulfonic acid)-b-poly(methyl methacrylate) / Poly(vinylidene fluoride) blend" Department of Materials Science and Engineering, Seoul National Unviersity; Journal of Power Sources 188 (2009) pp. 127-131.

* cited by examiner

*Primary Examiner* — Mark Kaucher
(74) *Attorney, Agent, or Firm* — Thomas F. Roland

(57) ABSTRACT

The invention relates to a polymer membrane composition having improved water flux and stable pore size. The water flux is improved by increasing the hydrophilicity of the membrane using a matrix polymer blended with controlled architecture amphiphilic block copolymers. Preferred membranes are those having a fluoropolymer matrix and acrylic amphiphilic block copolymers. The addition of the amphiphilic block copolymers are especially useful in microfiltration and ultra filtration membranes when used in water filtration.

9 Claims, No Drawings

WATER FLUX POLYMER MEMBRANES

FIELD OF THE INVENTION

The invention relates to a polymer membrane composition having improved water flux and stable pore size. The water flux is improved by increasing the hydrophilicity of the membrane using a matrix polymer blended with controlled architecture amphiphilic block copolymers. Preferred membranes are those having a fluoropolymer matrix and acrylic amphiphilic block copolymers. The addition of the amphiphilic block copolymers are especially useful in microfiltration and ultra filtration membranes when used in water filtration.

BACKGROUND OF THE INVENTION

There is a growing need to supply fresh water on a global basis to meet the needs of expanding populations. A variety of membrane technologies are actively employed to meet this need. Microfiltration (MF) and ultrafiltration (UF) are used to purify surface waters for drinking, pre-treat brackish and seawater for reverse osmosis, and treat wastewater (especially in membrane bioreactors) prior to discharge into the environment.

Polyvinylidene fluoride (PVDF) is a preferred polymer material for MF and UF membranes due to its excellent chemical resistance, especially to oxidants and halogens used in water purification. PVDF is also convenient to process by solution casting (or melt casting) into porous membranes. While PVDF is well established in microfiltration (nominal pore size >0.2 um) it has difficulties in smaller pore size membranes due to lower water flux. As pure water regulations become increasingly stringent, there is a move to require microfiltration membranes to filter below 0.1 um for removal of virus particles. This is now in the ultrafiltration range. For PVDF to work well in this smaller pore regime, it will be necessary to improve membrane water flux.

PVDF is a very hydrophobic polymer, which increases resistance to water flux in membranes. Making PVDF membranes more hydrophilic is essential to improving water flux. Many methods have been described for post treatment of PVDF membranes. These methods typically involved treating a porous PVDF membrane with a hydrophilic monomer (e.g. acrylic acid or hydroxyethylmethacrylate) followed by polymerization to create a hydrophilic surface treatment. These methods are described in U.S. Pat. No. 4,618,533 (M. J. Steuck inventor, Oct. 21, 1986), U.S. Pat. No. 4,855,163 (I. B. Joffe, P. J. Degen, F. A. Baltusis inventors, Aug. 8, 1989), and R. Revanur et al *Macromolecules* 2007, 40, 3624-3620. These polymerizations are typically free radical in nature, initiated either chemically or by radiation.

Other post treatment methods include soaking membranes in hydrophilic polymer solutions (e.g. hydroxyethylcellulose, polyethylene glycol) to impart a temporary hydrophilic coating, as described in U.S. Pat. No. 4,203,848 (J. D. Grandine II inventor, May 20, 1980). This method is suitable for single use, or batch process applications, but will not retain hydrophilicity for extended service. Other treatments involve chemical etching of the PVDF surface (by either caustic treatment or radiation), with or without, subsequent by oxidative treatment to create permanent hydrophilicity.

These post treatment methods add complexity and cost to the membrane manufacturing process. They require separate washing and drying steps to remove all post-treatment chemicals. These treatments may also be limited to surface functionality, while leaving internal pores hydrophobic. Alternatively, excessive polymerization of added monomers can lead to pore plugging or pore size reduction. This will reduce membrane flux. Finally, radiation and surface grafting processes will physically damage the PVDF polymer backbone, reducing mechanical properties.

Furthermore, capillary hollow fiber membranes are difficult to post treat by the above processes, and are even more susceptible to physical damage. Yet capillary hollow fiber membranes are the preferred choice for water treatment systems due to superior volumetric system performance. Improving hydrophilicity of PVDF hollow fiber membranes is a major technical challenge that remains to be solved.

Amphiphilic block copolymers are well known. The majority of amphiphilic polymers are diblock copolymers that are soluble in water. These diblock polymers have been used for a number of applications including, the thickening of aqueous solutions and to form viscoelastic gels, such as those described in U.S. Pat. Nos. 6,506,837, 6,437,040, and U.S. Patent application 2003/0162896.

Other amphiphilic triblock copolymers, known commercially as Pluronics, are also well described in the literature. These triblock copolymers can contain hydrophilic endblocks and a hydrophobic midblock or vice versa. The hydrophilic block segment is confined to polyethylene oxide (PEO) homopolymer. The triblocks containing hydrophilic endblocks are soluble in water. The triblocks containing hydrophobic endblocks will be insoluble in water.

Amphiphilic diblock polymers may be formed using stable free radical chemistry, as described in U.S. Pat. No. 6,111,025. The polymers described are limited to diblock structures, and furthermore describe the use of TEMPO-based nitroxide derivatives for he synthesis of the corresponding block copolymers. This class of free radical control agent [such as (2',2',6',6'-tetramethyl-1'-piperidyloxy-)methylbenzene mentioned in Macromolecules 1996, 29, pages 5245-5254] control only the polymerizations of styrene and styrenic derivatives and are not suited to the controlled polymerization of acrylics. U.S. Pat. No. 6,767,968 describes the use of living-type or semi-living type free radical polymerization to form ABA triblock copolymers having a random block with both hydrophobic and hydrophilic monomer units.

Arkema patent application U.S. 2006052545 describes a diblock copolymer adhesive formed by a controlled radical polymerization that is capable of absorbing water and providing adhesion under humid conditions.

Amphiphilic block polymers for use as additives and thickeners in oil-based compositions are described in WO 05/056739. U.S. 2008-0058475 describes the formation of amphiphilic triblock copolymers for use as hydrogels.

None of the aforementioned references teach the use of amphiphilic structures for membrane modification.

Specially grafted PVDF polymers have been tested in membrane applications. Grafting was accomplished by a controlled radical polymerization process (ATRP) to build hydrophilic groups onto the bulk polymer surface. This grafting technique is described in PCT WO 02/22712 A2 (A. M. Mayes, J. F. Hester, P. Banerjee, and A. Akthakul inventors, Mar. 21, 2002). This grafted polymer can then be fabricated into porous membranes using the phase inversion process. As with the other treatments, this approach adds significant cost to the process, as it is a multi-step process with several post polymerization transformation steps. Chemical modification of the bulk PVDF polymer can lead to crosslinking, which may affect solution properties, and ultimately the porosity of membranes. Therefore, direct modification of PVDF is a very costly and potentially unreliable means to make hydrophilic membranes.

Mayes and coworkers reported on blends of random acrylic-copolymers with PVDF to improve hydrophilicity *Macromolecules,* 1999, 32, 1643. These acrylic copolymers contained hydrophilic monomer groups such as polyethylene glycol methacrylate. As random copolymers, it is more difficult to control microstructure and composition than with controlled radical polymerization. It is argued that these hydrophilic "comb" polymers were specifically designed to surface segregate and concentrate at the membrane surface due to thermodynamics based on the theory that highly branched structures tend to surface segregate. While this is effective to improve surface hydrophilicity, there is a question as to how effective this treatment is for uniform hydrophilicity within the membrane pores. Higher surface concentration may also promote loss of additive by leaching, i.e., the hydrophobic backbone can't efficiently entangle with the polymer matrix. Furthermore, the heterogeneous structure of the polymers formed from the free radical process may limit the efficiency. It is well known that the control of architecture and chemical composition of both the backbone and the grafts are much more difficult to achieve as compared to block copolymers. Traditional free radical polymerization does not allow for the specific tailoring of polymer segment control and property adjustment.

Surprisingly, it has now been found that the addition of controlled architecture amphiphilic block copolymers to a hydrophobic polymer matrix in a polymeric membrane provides a stable pore size and increased flux, even at very small pore sizes. The block copolymer blends described herein are specifically designed to impart uniform and stable hydrophilicity. A fluoropolymer matrix with acrylic amphiphilic block copolymers forms a stable blend that is easily cast into membranes having a high water flux. Unlike conventional hydrophilic additives, the properly tailored block copolymers do not leach out with prolonged water washing. The addition of the amphiphilic block copolymers are especially useful in microfiltration and ultra filtration membranes when used in water filtration.

SUMMARY OF THE INVENTION

The invention relates to a polymeric membrane comprising:
  a) 99-20 weight percent of a hydrophobic matrix polymer, and
  b) 1-80 weight percent of an amphiphilic block copolymer having at least one hydrophilic block and at least one hydrophobic block compatible with said polymer matrix.

The invention also relates to a process by which an intimate blend of a hydrophobic matrix and an amphiphilic block copolymer are formed.

DETAILED DESCRIPTION OF THE INVENTION

The invention relates to polymeric membranes formed from the bulk or a solution containing a hydrophobic polymer matrix blended with a controlled architecture amphiphilic block copolymer.

By "block copolymer" as used herein means both true block polymers, which could be diblocks, triblocks, or multiblocks; branched block copolymers, also known as linear star polymers; comb block copolymers; and gradient polymers. One or more of the block copolymer segments may contain a graft copolymer. Gradient polymers are linear polymers whose composition changes gradually along the polymer chains, potentially ranging from a random to a block-like structure. Each block of the block copolymers may itself be a homopolymer, a random copolymer, a random terpolymer, a random tetrapolymer, a graft copolymer or a gradient polymer.

By "amphiphilic" as used herein means that at least one block of the copolymer is hydrophilic, and at least one block is hydrophobic.

By "hydrophilic" or "hydrophilic polymer" as used herein is meant the polymer block segment is water soluble, water dispersible, or generally capable of absorbing and/or transmitting water. The hydrophilic block could be a hydrophilic homopolymer, a random copolymer containing one or more hydrophilic monomers, or a random copolymer containing one or more hydrophilic monomers with one or more hydrophobic monomers. Ethylenically unsaturated monomers useful in forming the hydrophilic block polymer include but are not limited to, acrylic acid, methacrylic acid, and the salts, esters, anhydrides and amides of methacrylic and acrylic acid; dicarboxylic acid anhydrides; carboxyethyl acrylate; hydrophilic derivatives of acrylates; hydrophilic derivatives of styrene; and acrylamides. Specific useful monomers include, but are not limited to maleic anhydride, maleic acid, substituted maleic anhydride, mono-ester of maleic anhydride, itaconic anhydride, itaconic acid, substituted itaconic anhydride, monoester of itaconic acid, fumaric acid, fumaric anhydride, fumaric acid, substituted fumaric anhydride, monoester of fumaric acid, crotonic acid and its derivatives, acrylic acid, methacrylic acid, dimethylacrylamide, diethyl acrylamide, n-isopropylacrylamide, dimethylaminoethyl acrylate, diethylaminoethylacrylate, styrene sulfonic acid, acrylamido 2-methyl 2-propane sulfonate, vinylpyrrolidone, 2-carboxyethyl acrylate, methyl acrylate, ethyl acrylate, 2-methoxyethyl acrylate, hydroxyethyl acrylate, hydroxyethyl methacrylate, polyethylene glycol acrylate, polyethylene glycol methacrylate, polyethyleneglcycol-methylether-acrylate, polyethyleneglycol-methylether methacrylate. Salts of the acid monomers and quaternized versions of the amines are also anticipated in the invention, and the hydrophilic polymer segment may exist in a neutralized or partially neutralized form. Preferred hydrophilic monomers of the invention include acrylic acid (AA), methacrylic acid (MAA), salts of acrylic and methacrylic acid, methoxyethyl acrylate, dimethylacrlyamide, vinylpyrrolidone, 2-carboxyethyl acrylate, polyethylene glycol acrylate (PEGA), polyethyeleneglycol-methylether acrylate (MPEGA), polyethylene glycol methacrylate (PEGMA), polyethyleneglycol-methylether-methacrylate (MPEGMA), acrylamido 2-methyl 2-propane sulfonate, styrene sulfonic acid and itaconic acid.

The number average molecular weight of the hydrophilic block is in the range of 1 kg/mol to 160 kg/mol, preferably 3 kg/mol to 100 kg/mol, and most preferably 5-60 kg/mol.

The hydrophobic block copolymer segments are hydrophobic homopolymers, random copolymers containing one or more hydrophobic monomers, or a random copolymer containing one or more hydrophobic monomers with one or more hydrophilic monomers. The hydrophobic block is selected for compatibility with the membrane matrix polymer(s). By "hydrophobic" and "hydrophobic polymer" as used herein is meant the polymer block segment is non-soluble or dispersible in water. Examples of ethylenically unsaturated monomers useful in forming the hydrophobic polymer block(s) include, but are not limited to, styrene, hydrophobic derivatives of styrene, conjugated dienes, $C_{1-30}$ straight, cyclic, or branched alkyl and aryl acrylates, $C_{1-30}$ straight, cyclic, or branched alkyl and aryl methacrylates, olefins, fluorine-containing monomers, and silicon-containing monomers. Specific examples of the hydrophobic monomers include styrene; alpha-methyl styrene, lauryl methacrylate (or other long chain alkyl acrylates or methacrylates, e.g., $C_6$-$C_{30}$ alkyl esters 2-ethylhexyl acrylate and 2-ethylhexylmethacrylate, octyl acrylate, and octyl methacrylate, decyl acrylate and decyl methacrylate, etc.), 1,1-dihydroperfluoroalkyl acrylates and methacrylates of the general structure, $CF_3(CF_2)_nCH_2OCOC(R)=CH_2$, in which R is hydrogen or methyl and n is typically 2 to 20, hexafluorobutyl acrylate, triisopropylsilyl acrylate, polydimethylsiloxane acrylate and (meth)acrylate, isobornyl acrylate, isobornyl methacrylate, butadiene, isoprene, methylmethacrylate, t-butyl acrylate and t-butyl methacrylate. Preferred monomers include, styrene, isobornyl acrylate, isobornyl methacrylate, a mixture of 1,1-dihydroperfluoroalkyl acrylates and methacrylates of the general structure, $CF_3(CF_2)_nCH_2OCOC(R)=CH_2$, in which R is hydrogen or methyl and n is typically 6 to 18, t-butyl acrylate, t-butyl methacrylate and methyl methacrylate.

The number average molecular weight of each end blocks is in the range of 0.5 kg/mol to 120 kg/mol, preferably 5 kg/mol to 80 kg/mol.

The block copolymers of the present invention are formed by a controlled radical polymerization process. These processes generally combine a typical free-radical initiator with a compound to control the polymerization process and produce polymers of a specific composition, specific architecture, and having a controlled molecular weight and narrow molecular weight range. These free-radical initiators used may be those known in the art, including, but not limited to peroxy compounds, peroxides, hydroperoxides and azo compounds which decompose thermally to provide free radicals. In one preferred embodiment the initiator may also contain the control agent. The block copolymers made by a controlled radical polymerization (CRP) process enables tailoring of the block structure to optimize blend stability, matrix compatibility, and hydrophilicity enhancement.

Block copolymers of the present invention are preferably those formed by controlled radical polymerization (CRP). They differ from random copolymers that may contain some blocks of certain monomers related either to a statistical distribution, or to the differences in reaction rates between the monomers. In these random polymerizations, there is essentially no control over the polymer architecture, molecular weight, or polydispersity and the relative composition of the individual polymer chains is non-uniform When a copolymer segment is synthesized using a CRP technique such as nitroxide-mediated polymerization, it is often termed a gradient or profiled copolymer. This type of copolymer is different than a copolymer obtained by a traditional free radical process. The properties of the copolymer will be dependant on the monomer composition, control agent used, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization step (i.e., the monomer mix is not static over the lifetime of the growing chain), thus the composition of the chains is uniform and is dependant on the corresponding monomer mix with respect to the reaction time. In a preferred embodiment, the hydrophilic copolymer segment of the invention is a profiled, or gradient block copolymer.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

In principle, any living or controlled polymerization technique, compatible with the monomer choices, can be utilized to make the block copolymer. One preferred method of controlled radical polymerization is nitroxide-mediated CRP. Nitroxide-mediated CRP is preferred, as it allows for the use of a larger variety of monomers in the preparation of controlled architectured copolymers, including the use of acrylics and especially acid functional acrylics. The synthesis of a nitroxide-mediated CRP multi-block amphiphilic copolymer of the invention is found in U.S. 2008/0058475, incorporated herein by reference.

The amphiphilic block copolymers of the invention generally have a molecular weight (Mw) in the range of from 10 kg/mol to 400 kg/mol.

The amphiphilic copolymer of the invention can contain neutralizable monomer units and in some cases these monomer units can be pre-neutralized. By "neutralized" as used herein is meant that the hydrophilic block of the amphiphilic copolymer is fully or partially in the salt form. Neutralization can take place at any point during the polymerization, or as a post-polymerization process, such as, during the formulation, blending, or fabrication of a film, article, or part. The presence of neutralizable monomer units can impart pH dependency within the membrane.

A useful feature of the invention is the inherent ability to design structure-property behavior using a controlled polymerization process. This allows one to tailor the block composition, Mw, and architecture to: enhance the blending and processing (compatibilize with the polymers and process solvents used), enhance matrix compatibilization to promote permanency after processing (hydrophobic block is entangled with the membrane matrix), and control viscosity of the melt or solvent blending process, etc. For example, to impart pH dependency of a hydrophilic block, acrylic acid can be copolymerized into this segment. To improve matrix stability of a hydrophilic graft copolymer, a matrix miscible hydrophobic block segment can be added to form an A-B diblock copolymer of a hydrophobic A block and a hydrophilic B block graft copolymer.

A preferred block copolymer of the invention is one having a hydrophilic segment and at least one polyvinylidene fluoride compatible or miscible segment, e.g., a diblock having a hydrophobic block of primarily polymethylmethacrylate (PMMA), connected to a hydrophilic second block containing primarily (meth)acrylic monomer units. The phase separation of the PMMA (hydrophobic) and hydrophilic blocks is a key part of this invention. This specific phase separation enables a stable additive structure (by compatible mixing of the PMMA block with PVDF) and efficient use of the hydrophilic block, as the hydrophilic block will separate from the PVDF matrix and localize on the pore walls of the membrane. This will generate a hydrophilic internal surface that will promote higher water flux. These amphiphilic blocks may also promote the generation of more uniform pore sizes and may aid in the formation of smaller pore sizes based on the small size scale of phase separation inherent to these materials. These types of block copolymers can be either diblock (one PMMA block, one hydrophilic block), or triblock (PMMA-hydrophilic block-PMMA; or hydrophilic block-PMMA-hydrophilic block); or other unique combination of block structures, such as but not limited to, star block copolymers, and comb block polymers.

Other examples of amphiphilic block copolymers useful in the invention include, but are not limited to PMMA-PAMPS, PMMA-PMAA, PMMA-PAA, PMMA-PDMA, PMMA-PMEA, PMMA-PSSA, PMMA-PPEGA, PMMA-PMPEGMA, PMMA-PPEGMA, and PMMA-PVP, wherein AMPS is acrylamido 2-methyl 2-propane sulfonate, MAA is methacrylic acid, AA is acrylic acid, DMA is dimethylacrylamide, MEA is methoxy ethyl acrylate, SSA is styrene sulfonic acid, PEGA is polyethylene glycol acrylate, MPEGMA is polyethyleneglycol-methylether-methacrylate, PEGMA is polyethylene glycol methacrylate, and VP is vinylpyrrolidone. In each case, the hydrophilic block can contain a mixture of the hydrophilic monomers cited above or contain a mixture of the hydrophilic monomers with hydrophobic monomers of the invention.

The membrane matrix polymer can be any hydrophobic polymer, including but not limited to PVDF, PVDF-co-hexafluoropropylene (HFP), ECTFE, polyvinylfluoride, polytetrafluroethylene (PTFE), polyvinyl chloride (PVC), polyolefins, polystyrene (and styrene derivatives), polyamides, polysulfones, and polyethersulfones. In each case the corresponding matrix soluble block can be tuned to ensure matrix compatibilization and promote permanency after processing. Fluoropolymers are preferred. Fluoropolymers useful in the invention include those containing at least 50 mole percent of one or more flouromonomers.

Fluoromonomers useful in the practice of the invention include, for example, vinylidene fluoride ($VF_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3, 3-tifluoropropene a fluorinated vinyl ether, a fluorinated allyl ether, a non-fluorinated allyl ether, a fluorinated dioxole, and combinations thereof.

Especially preferred copolymers made by the process of the invention are copolymers of VDF with HFP, TFE or CTFE, comprising from about 50 to about 99 weight percent VDF, more preferably from about 70 to about 99 weight percent VDF.

Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

The block copolymers may be added separately to the hydrophobic polymer matrix resin, or pre-compounded with the matrix polymer prior to dissolution.

Membranes are generally formed by dissolving or dispersing the matrix monomer and amphiphilic copolymer in a solvent. From 99-20, preferably 99-40, and more preferably 90-70 weight percent of hydrophobic matrix polymer is blended with 1-80, 1-60, and preferably 5 to 40 weight percent the amphiphilic block copolymer. Useful solvents include, but are not limited to N-methylpyrrolidone, dimethylacetamide, dimethylsulfoxide, N,N-dimethylformamide, tetramethylurea, triethylphosphate, acetone, and tetrahydrofuran, or mixtures thereof. The dissolution process may either be carried out in a heated flask using an overhead stirrer or in a sealed jar that is placed on a roller. When dissolving in a jar, it is usually necessary to heat the solution to 50° C. to fully dissolve.

Small amounts of hydrophilic additives may be added to the polymer/block copolymer solution to help promote hydrophilicity. Useful additives include, but are not limited to polyethylene glycol (PEG), polyethylene glycol methacrylate (PEGMA), propylene glycol (PG), polyacrylic acid (PAA), and polymethyacrylic acid (PMA).

In a preferred embodiment, no additional additives, are included in the membrane formulation, only the Mock copolymer and PVDF resin. This method is described in examples 9-18. This preferred method avoids addition of extra pore forming additives, which reduces material expense and lowers complexity of the formulation. Membranes made without the use of the hydrophilic additives typically added in membrane formation show significantly higher water permeability for the simple blends of acrylic block copolymer with PVDF resin, compared to more complex formulations containing additives such as PEG. These simple blends make formulation easier and show the feasibility of a "single" component ingredient of pre-blended PVDF and acrylic block copolymer resin. They also avoid the possible formation of voids due to the additives, and the possible loss of properties due to wash-out of the additives. The polymer dispersion is then cast into a membrane by processes known in the art. These formulations can also be processed into hollow fiber membranes by processes known in the art. The membranes of the invention showed higher water flux, and lower contact angle (higher hydrophilicity), than unmodified membranes. These block copolymer blends also showed higher water flux than blends made from conventional random copolymer acrylic resins. Furthermore, the conventional polymers tended to wash out over time, thus flux decreased with usage. The amphiphilic block copolymer maintained the increased flux suggesting it has some permanence at the pore surface. This shows that the block structure imparts superior performance for hydrophilic modification.

Another aspect of the invention is the process to form intimate blends of block copolymers and hydrophobic polymers using a two-stage, or seeded, emulsion process. In this process a block copolymer is subsequently polymerized on a pre-formed hydrophobic polymer latex, also known as a seed latex, resulting in a 'hybrid' latex particle comprising the hydrophobic polymer and block copolymer. In fact, any polymer latex may be used as the seed latex in this process. These hybrid latex particles may have a variety of particle morphologies as will be evident to those skilled in the art, depending on specific component compositions and may include core-shell or interpenetrated network morphologies. In the case of a hydrophilic block copolymer polymerized on a hydrophobic seed polymer, a preferred morphology is core-shell; wherein the hydrophilic block of the block copolymer resides at the particle-water interface while the hydrophobic block resides near, or is entangled with, the hydrophobic seed polymer phase.

The hydrophobic polymer seed latex can be formed by conventional free-radical emulsion polymerization techniques. The block copolymer is formed by any controlled radical emulsion polymerization process, with nitroxide-mediated polymerization being preferred. The block copolymer may be formed by using a combination of a free-radical initiator plus control agent, or more preferably an adduct of a free-radical initiator and control agent, such as BlocBuilder® controller, available from Arkema. The free-radical initiator or initiating fragment from an initiator/controller adduct can be either hydrophilic (water-soluble) or hydrophobic (oil-soluble) in nature. In the latter case, the initiator plus control agent or initiator/controller adduct resides directly in the hydrophobic seed polymer particles, where controlled polymerization is effected. In the former case, these species reside predominantly in the water-phase. Macroinitiators, or pre-formed oligomers or polymers capable of undergoing further controlled radical polymerization, may also be used to initiate block copolymer formation. Preferably, the initiator/control agent combination or adduct, and most preferably macroinitiators, are hydrophilic in nature and soluble in water. In one preferred embodiment BlocBuilder® controller is rendered water-soluble.

A general representation describing the process of this aspect of the invention is as follows. A hydrophobic polymer seed latex made by conventional free-radical polymerization is swollen by a portion of the subsequent block copolymer first stage monomer or monomer mix. A water-soluble initiator/controller adduct or macroinitiator is added, the latex is inerted and heated to an appropriate temperature to effect controlled polymerization. After an appropriate time period the monomer is polymerized to a conversion such that the 'living' polymer chain-ends, which now reside within the hydrophobic polymer seed particles, are of sufficient molecular weight to prevent migration out of the seed particles. In this process the hydrophobic seed polymer particles become the polymerization loci for the block copolymer polymerization, both hydrophobic polymer seed particle number and particle size distribution are maintained, and the final particle size is predictable (by mass conservation). Further addition of monomer or a mix of monomers either increases the molecular weight of this first stage polymer or copolymer or begins a subsequent stage or block. After block copolymer formation is complete residual monomers can be fully converted to polymer, i.e., 'chased', via conventional free-radical techniques.

Yet another aspect of this invention is the process to form blends of block copolymers and hydrophobic polymers by co-isolating a latex blend of these components by processes known in the art i.e., spray-drying, coagulation, freeze-drying, etc.

The block copolymers are preferably amphiphilic in nature, but could be comprised of all non-hydrophilic blocks. In the case that amphiphilic block copolymers are formed, the blend of the hydrophobic polymers and the amphiphilic block copolymers can be utilized as a membrane with improved water flux and stable pore size as previously described. These materials could also be used as polymer electrolyte membranes wherein the hydrophilic portion will phase separate to form continuous conducting channels through the membrane matrix. Tailoring the polymer composition allows for the tailoring of the composite properties.

Furthermore, the hybrid latex formed could be used to make hydrophilic-modified polymer coatings. These modified coatings will have improved wetability and could be used as lubricious coatings, self cleaning architectural coatings, anti-fouling coatings, anti-fogging coatings, adhesion promoting coatings for paints and other surface treatments, and other such coatings as will be evident to those skilled in the art.

EXAMPLES

General:

The controlled architecture amphiphilic block copolymers were synthesized using the following generic protocol. Molecular weights were targeted by manipulating the monomer to initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the unreacted monomer under vacuum. The polymer examples were run neat or in solution. Typical solvents used included, dioxane, n-methylpyrrolidinone, dimethylacetamide, dimethylformamide, tert-butyl alcohol, n-butyl alcohol, toluene, ethyl benzene, methyl acetate, ethyl acetate, propyl acetate, butyl acetate, ethanol, cyclohexanone, cyclopentanone and methyl ethyl ketone. Polymerizations were carried out at ambient pressures or run under nitrogen pressure up to 100 psi. Polymerizations were run in standard polymerization vessels both with and without shearing capacity, although adequate mixing capabilities were preferred.

As a general procedure, a specific amphiphilic block copolymer composition is prepared by various traditional monomer addition and polymer isolation protocols, as generically described below and evident to those skilled in the art, dependant on the desired final block composition.

For example, a pure block copolymer is prepared by isolating the pure 1st block by precipitation techniques or by evaporating the residual monomer upon completion of the first block synthesis, followed by the addition of a second monomer composition different from the first. This second monomer composition then undergoes polymerization to make the pure block copolymer.

Profiled block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Block copolymer/homopolymer blends were prepared by employing well known chasing techniques. For example, a first block is synthesized by polymerizing a monomer or monomer mix to a desired conversion (less than 100%). The reaction mixture is then cooled to a temperature where the nitroxide is stable at which time a secondary initiation source, such as an organic peroxide, is added to carry out the polymerization of the residual 1st block monomers. After the chasing step is complete, the 2nd block monomer(s) can be added and the temperature increased to allow for the activation of the nitroxide end groups, which subsequently leads to the formation of a block copolymer. The composite material will then comprise of both the chased homopolymer (similar in nature to the 1st block) and a block copolymer. The chasing step can be carried out again with the 2nd block or can be used in place of the 1st block chase.

The synthesis of the copolymers of the invention as described above are further illustrated by the corresponding specific, but non-limiting polymer examples listed below. Other copolymers of this invention can be prepared in an analogous manner, as it will be evident to those skilled in the art.

The following examples demonstrate reduction to practice of the invention. Unless otherwise noted, molecular weights are weight average molecular weight, and percentages are weight percentages.

Example 1

An amphiphilic diblock copolymer was prepared by weighing 175 g (0.40 mol) of methoxy-terminated polyethyleneglycol methacrylate (MPEG(350)MA), 429 g (5.0 mol) of methyl acrylate (MA), and 25 g (0.29 mol) MAA in 50 g butyl acetate. 19.14 g (50.2 mmol) BLOCBUILDER was added and the mixture heated to 105° C. The monomers were allowed to react for 3 hours at 105° C. to reach 61% conversion of MA and 95% conversion of both MAA and MPEGMA. The polymer and solvent mixture was stripped under vacuum at 60-70° C. to remove most of the residual MA. To make the second block, 359 g MMA was added to a mixture of 70.0 g first block, 3.9 g MA, 16 g butyl acetate, 121.76 g acetone. The PMMA block was formed by reaction at 105° C. for 2 hours until reaching 55% conversion resulting in a PMA/MPEGMA/MAA-block-PMMA block copolymer. Half of the resulting polymer was dried under vacuum at 130° C. for 3 hours.

Example 2

An amphiphilic diblock copolymer was prepared by weighing together 600 grams of methyl acrylate (MA), 16.3 g of BLOCBUILDER and bubbling the mixture with nitrogen for 10 minutes. The mixture was then heated to 100° C. and reached 70% conversion forming a living PMA $1^{st}$ block. The living PMA was extended further with additional MA and sodium styrene sulfonate (SSNa) by the following method: Weighed 80.0 grams of PMA solution (70% poly, 30% MA), 30.0 grams MA, 200 g ethanol, 50.0 grams of SSNa, 0.1 g of free nitroxide and 215 g deionized water to a 1 L stainless steel reactor and bubbled the heterogeneous system with nitrogen for 10 minutes. Heated mixture to 100° C. for 2 hours, then 115° C. for an additional 2 hours, reaching 75% conversion of MA and. complete conversion of SSNa.

Example 3

A neutralized block copolymer was prepared by dissolving 216 g of the polymer from example 1 in 212 g of additional acetone. To this solution was added 3.425 g of 20% NaOH(aq). The resulting solution was dried under vacuum at 130° C. for 3 hours Example 4

A living, water-soluble first block was prepared by mixing 10.4 g (46.3 mmol) sodium styrene sulfonate hydrate, 3.823 g (10.0 mmol) BLOCBUILDER, 0.15 g (0.43 mmol) (excess nitroxide), 0.429 g (10.7 mmol) NaOH, 80.84 g deionized water and 13.1 g (101 mmol) methoxyethyl acrylate (MEA). The homogeneous mixture was heated to 90-95° C. for 3 hours to reach 68% conversion of MEA.

A seeded acrylic emulsion was prepared using 7.8 g of KYNAR AQUATEC seed polymer latex (41.2% solids) (Arkema Inc.). Added 5.05 g deionized water, 3.617 g MMA, 1.015 g of the preceding first block solution and heated 3 hours at 100° C. to reach 40% conversion of MMA. The colloidal stability was maintained as evidenced by narrow particle size distribution and step-wise growth in particle size.

Example 5

PVDF resin (15.0 g, avg Mw~400,000-500,000) was mixed with 3.0 g of an acrylic copolymer [PMMA (block Mw~50,000)-block-PMA/MPEGMA/AA (block Mw~3000, MPEGMA~40%, PMA~50%, AA~10%)], N-methylpyrrolidone (NMP) solvent (67.0 g), and polyethylene glycol (10.0 g of 400 MW, 5.0 g of 1000 MW). This mixture was stirred at 65° C. for 2 hours, until all components were fully dissolved. The solution was allowed to set overnight to allow any air bubbles to dissipate. This solution was then used to cast membranes.

Membranes were cast on polypropylene sheet using a draw down square at either 15 mil or 10 mil gap clearance. The cast membranes were then immersed in a non-solvent bath of water (at room temperature) containing a small amount (~200 ppm) of non-ionic surfactant. The membrane solution converted to a solid membrane by phase inversion in ~2 minutes. The solid membrane was then peeled off the carrier and transferred to a 45° C. water bath to soak for 30 minutes. The membrane was then soaked in fresh deionized water for another 30 minutes, followed by a 30-minute soak in isopropanol. The membranes were then left to air dry. After air drying, the membranes were given a final drying cycle in an oven at 165° F. for 1 hour.

In a variation of this membrane casting method the membranes were exposed to high humidity (>80%) for 1 or 2 minutes, prior to immersion in the non-solvent bath. The subsequent membrane formation and washing procedures were the same as with no humidity exposure.

The dried membranes were analyzed by capillary flow porometery, water permeation testing, and bubble point pore diameter (before and after water flux to monitor any changes). The bubble point method is well known to those of ordinary skill with porous material characterization and is described by Jacobs & Koros in *J. Membrane Science*, 124, (1997), 149.

Example 6

Similar to example 5, the following components were blended together: PVDF (15.0 g, Avg Mw 400-500 K), 3.0 g block copolymer [PMMA (block Mw~20,000)-block-PMA/MPEGMA (block Mw~20,000, MPEGMA~50%, PMA~50%)], water 2.0 g, PEG (6.0 g 400 Mw, 3.0 g 1000 Mw), NMP (71.0 g). This solution was used to cast membrane according to the method described in Example 5.

Example 7

Using the method of Example 5, the following ingredients were blended then cast into membranes: PVDF (15.0 g, avg. Mw 400-500 K), 3.0 g block copolymer [PMMA (block Mw~50,000)-block-PMA/MPEGMA (block Mw~20,000, MPEGMA~35%, PMA~65%)], water 2.0 g, PEG (6.0 g 400 Mw, 3.0 g 1000 Mw), NMP (71.0 g). This solution was used to cast membrane according to the method described in Example 5.

Example 8

Using the method of Example 5, the following ingredients were blended then cast into membranes: PVDF (15.0 g, Avg Mw 400-500 K), 3.0 g block copolymer [PMMA (block Mw~50,000)-block-PMA/MPEGMA (block Mw~40,000, MPEGMA~35%, PMA~65%)], water 2.0 g, PEG (6.0 g 400 Mw, 3.0 g 1000 Mw), NMP (71.0 g). This solution was used to cast membrane according to the method described in Example 5.

Example 9

Using the method of Example 5, the following ingredients were blended then cast into membranes: PVDF (15.0 g, avg. Mw 400-500 K), 3.0 g of a triblock copolymer [(PMMA end blocks, Mw~10,000 each block)-block-PMA/MPEGMA/ MAA (block Mw~80,000, MPEGMA~30%, PMA~65%, MAA~5%)], water 2.0 g, PEG (6.0 g 400 Mw, 3.0 g 1000 Mw), NMP (71.0 g). This solution was used to cast membrane according to the method described in Example 5.

Example 10

Using the method of Example 5, the following ingredients were blended then cast into membranes: PVDF (15.0 g, Avg Mw 400-500 K), 3.0 g of a triblock copolymer [(PMMA end blocks, Mw~10,000 each block)-block-PMA/MPEGMA/ MAA (block Mw~80,000, MPEGMA~-30%, MA~65%, MAA~5% with 10% neutralization by NaOH)], water 2.0 g, PEG (6.0 g 400 Mw, 3.0 g 1000 Mw), NMP (71.0 g). This solution was used to cast membrane according to the method described in Example 5.

Example 11 (Comparative)

To act as a control experiment, a random copolymer acrylic resin was blended with PVDF resin using the method described in Example 5 and membranes were cast from this blend. PVDF resin (15.0 g, average Mw~400-500 K) was blended with a PMMA acrylic copolymer resin (3.0 g) containing acid functionality and an alkyl-acrylate co-monomer (Total Mw~60-100 K, acid content 1-8%, acrylic co-monomer content 2-10%), water (2.0 g), polyethylene glycol (6.0 g 400 Mw, 3.0 g 1000 Mw), and NMP (71.0 g).

Example 12

A pure PVDF membrane was prepared by mixing PVDF resin (15.0 g, avg. Mw~400-500 K) with polyethylene glycol (6.0 g 40 Mw, 3.0 g 1000 Mw), water (2.0 g), and NMP (74.0 g) and casting as described in Example 5.

Example 13

A simplified formulation shows the impressive utility of these block copolymers. PVDF resin (15.0 g, avg. Mw~400-500 K) is blended with a block copolymer resin [PMMA (block Mw~10,000)-block-PMA/MPEGMA/MAA (block Mw~40,000, MA~60%, MPEGMA~35%, MAA~5%)], in dimethylacetamide (DMAC) 82.0 g. This mixture was stirred at 65° C. for 2 hours, until all components were fully dissolved. The solution was allowed to set overnight to allow any air bubbles to dissipate. This solution was then used to cast membranes.

Membranes were cast on polypropylene sheet using a draw down square at either 15 mil or 10 mil gap clearance. The cast membranes were then exposed to a humidified atmosphere (>80% RH) for one minute followed by immersed in a non-solvent bath of water (at 45° C.) containing a small amount (~200 ppm) of non-ionic surfactant. The membrane solution converted to a solid membrane by phase inversion in ~2 minutes. The solid membrane was then peeled off the carrier and transferred to a 45° C. water bath to soak for 30 minutes. The membrane was then soaked in fresh deionized water for another 30 minutes, followed by a 30-minute soak in isopropanol. The membranes were then left to air dry. After air-drying, the membranes were given a final drying cycle in an oven at 165° F. for 1 hour. Membranes thus prepared had very good water permeability.

Example 14

In a method similar to Example 13, the following ingredients were blended then cast into membranes: PVDF (15.0 g, avg. Mw 400-500 K), 3.0 g block copolymer [PMMA (block Mw~10,000)-block-P-MA/MPEGMA/MAA (block Mw~40,000, MA~60%, MPEGMA~35%, MAA~5%], and N-methylpyrrolidone (82.0 g). This solution was used to cast membranes on polypropylene sheet (10-15 mils wet thickness), but without any humidity exposure. These membranes were quenched in a room temperature water bath containing non-ionic surfactant (~200 ppm).

Example 15

Using the method of Example 13, the following ingredients were blended then cast into membranes: PVDF (15.0 g, Avg Mw 400-500 K), 3.0 g block copolymer [PMMA (block Mw~25,000)-block-P-MA/MPEGMA/MAA (block Mw~40,000; MA~60%, MPEGMA~35%, MAA~5%], and DMAC (82.0 g). This solution was used to cast membrane according to the method described in Example 13.

Example 16

Using the method of Example 13, the following ingredients were blended then cast into membranes: PVDF (15.0 g, Avg Mw 400-500 K), 3.0 g block copolymer [PMMA (block Mw~35,000)-block-P-MA/MPEGMA/MAA (block Mw~40,000, MA~60%, MPEGMA~35%, MAA~5%], and DMAC (82.0 g). This solution was used to cast membrane according to the method described in Example 13.

Example 17

Using the method of Example 13, the following ingredients were blended then cast into membranes: PVDF (15.0 g, Avg Mw 400-500 K), 3.0 g block copolymer [PMMA (block Mw~40,000)-block-P-MA/MPEGMA/MAA (block Mw~10,000, MA~60%, MPEGMA~35%, MAA~5%], and DMAC (82.0 g). This solution was used to cast membrane according to the method described in Example 13.

Example 18

Using the method of Example 13, the following ingredients were blended then cast into membranes: PVDF (15.0 g, Avg Mw 400-500 K), 3.0 g of neutralized block copolymer [PMMA (block Mw~40,000)-block-P-MA/MPEGMA/ MAA-Na (block Mw~10,000, MA~60%, MPEGMA~35%, MAA-Na~5%], and DMAC (82.0 g). This solution was used to cast membrane according to the method described in Example 13.

Example 19

Using the method of Example 13, the following ingredients were blended then cast into membranes: PVDF (15.0 g, Avg Mw 400-500 K), 3.0 g block copolymer [PMMA (block Mw~10,000)-block-P-MA/MPEGMA/MAA (block Mw~10,000, MA~60%, MPEGMA~35%, MAA~5%], and DMAC. This solution was used to cast membrane according to the method described in Example 13.

Example 20

Using the method of Example 13, the following ingredients were blended then cast into membranes: PVDF (15.0 g, Avg Mw 400-500 K), 3.0 g of neutralized block copolymer [PMMA (block Mw~10,000)-block-P-MA/MPEGMA/MAA-Na (block Mw~40,000, MA~60%, MPEGMA~35%, MAA-Na~5%], and DMAC. This solution was used to cast membrane according to the method described in Example 13.

Example 21

Following the casting modifications in Example 14, a random copolymer acrylic resin was blended with PVDF resin and membranes cast, to compare with block copolymer blended membranes. PVDF resin (15.0 g, average Mw~400-500 K) was blended with a PMMA acrylic copolymer resin (3.0 g) containing acid functionality and an alkyl-acrylate co-monomer (Total Mw~60-100 K, acid content 1-8%, acrylic co-monomer content 2-10%), and NMP (82.0 g).

Example 22 (PVDF Control)

Following the casting modifications in Example 14, control membranes were prepared using only PVDF resin (no other additives) and membranes cast. PVDF resin (15.0 g, average Mw~400-500 K) was dissolved in NMP (85.0 g), and membranes were cast from this formulation.

In the above examples, the block copolymer additives were separately added to the PVDF resin, solvent, and any other additives (e.g. polyethylene glycol). In another embodiment of this invention, the block co-polymers can be pre-blended with the PVDF resin by known compounding methods (e.g. melt extrusion). These pre-compounded materials can be made up in a variety of blend ratios to tailor the ultimate properties of the final membrane. A single blend product will be easier to handle, and avoids the need to stock additional ingredients at the end user.

The data below show the water permeability data as well as bubble point pore diameters. The data show a clear trend for the superiority of the acrylic block copolymer blends for improving both water flux, while maintaining a tight bubble point suitable for ultrafiltration, compared to pure PVDF control, or blends made with a conventional acrylic copolymer resin. For ultrafiltration, it is desirable to have bubble points below 0.2 um. All the block copolymer membranes had BPD below 0.2 um.

TABLE 1

Water permeability and bubble point data for membranes

| Membrane (per example) | Water Flux | Bubble Point Dia. (Galwick ®) |
|---|---|---|
| Example 5 | 1.13 | 0.195 |
| Example 6 | 4.018 | 0.148 |
| Example 7 | 1.1 | 0.145 |
| Example 8 | 1.19 | 0.168 |
| Example 9 | 1.8 | 0.122 |
| Example 10 | 1.8 | 0.122 |

TABLE 1-continued

Water permeability and bubble point data for membranes

| Membrane (per example) | Water Flux | Bubble Point Dia. (Galwick ®) |
|---|---|---|
| Example 11 | 0.56 | 0.191 |
| Random acrylic resin additive | | |
| Example 12 | 0.32 | 0.320 |
| Pure PVDF resin control | | |
| Example 13 | 29.48 | 0.150 |
| Example 14 | 14.21 | 0.144 |
| Example 15 | 29.19 | 0.197 |
| Example 16 | 6.842 | 0.154 |
| Example 17 | 1.819 | 0.162 |
| Example 18 | 6.342 | 0.164 |
| Example 19 | 2.305 | 0.194 |
| Example 20 | 30.10 | 0.198 |
| Example 21 | 1.31 | 0.182 |
| Random acrylic resin additive | | |
| Example 22 | 0.066 | 0.171 |
| Pure PVDF resin control | | |

Galwick (a perfluoropolyether, surface tension 15.9 dynes/cm) is a registered trademark of Porous Materials Incorporation, Ithaca, NY.

What is claimed is:

1. A polymeric membrane having uniform stable hydrophilicity and uniform pore size useful as a water microfiltration or ultrafiltration membrane consisting of a stable, uniform blend of:
    a) 99-20 weight percent of a hydrophobic matrix polymer, said matrix polymer comprises a polyvinylidene fluoride homopolymer, or a polyvinylidene copolymer comprising at least 50 mole percent of vinylidene fluoride monomer units,
    b) 1-80 weight percent of an amphiphilic block copolymer having 1) at least one hydrophilic bock and 2) at least one hydrophobic block compatible with said polymer matrix, wherein said hydrophilic and hydrophobic blocks comprise acrylic polymers, wherein said hydrophilic block is a gradient copolymer having two or more different monomer units, and wherein said hydrophilic block comprises one or more monomer units selected from the group consisting of hydroxyethyl acrylate, hydroxyethyl methacrylate, polyethylene glycol acrylate (PEGA), polyethyeleneglycol-methylether acrylate (MPEGA), polyethylene glycol methacrylate (PEGMA), polyethyleneglycol-methylether-methacrylate (MPEGMA), acrylamido 2-methyl 2-propane sulfonate, styrene sulfonic acid and itaconic acid, and
    c) optionally one or more hydrophilic additives selected from the group consisting of polyethylene-glycol (PEG), polyethylene glycol methacrylate (PEGMA), propylene glycol (PG), polyacrylic add (PAA), and polymethacrylic acid (PMA);
    wherein said polymeric membrane has a maximum pore size of less than 0.3 um, and wherein said block copolymer is a controlled radical polymerized copolymer.

2. The polymeric membrane of claim 1 wherein said block copolymer is a di-, or tri-block copolymer.

3. The polymeric membrane of claim 1 wherein said amphiphilic block copolymer comprises residual nitroxide end-groups.

4. The polymeric membrane of claim 2 wherein said block copolymer is non-water soluble.

5. The polymeric membrane of claim 1 comprising 99-40 weight percent of hydrophobic matrix polymer and 1-60 weight percent of amphiphilic block copolymer.

6. The polymeric membrane of claim 1 comprising 90-70 weight percent of hydrophobic matrix polymer and 10-30 weight percent of amphiphilic block copolymer.

7. The polymeric membrane of claim 1, wherein said amphiphilic block copolymer is partially or fully neutralized.

8. The polymeric membrane of claim 1, wherein said hydrophobic matrix polymer and amphiphilic block copolymer form an intimate blend.

9. The polymeric membrane of claim 8, wherein said intimate blend is an interpenetrating polymer network (IPN) or a core-shell morphology.

* * * * *